May 28, 1946. E. E. WEMP Re. 22,761
TRANSMISSION
Original Filed Aug. 23, 1939 9 Sheets-Sheet 1
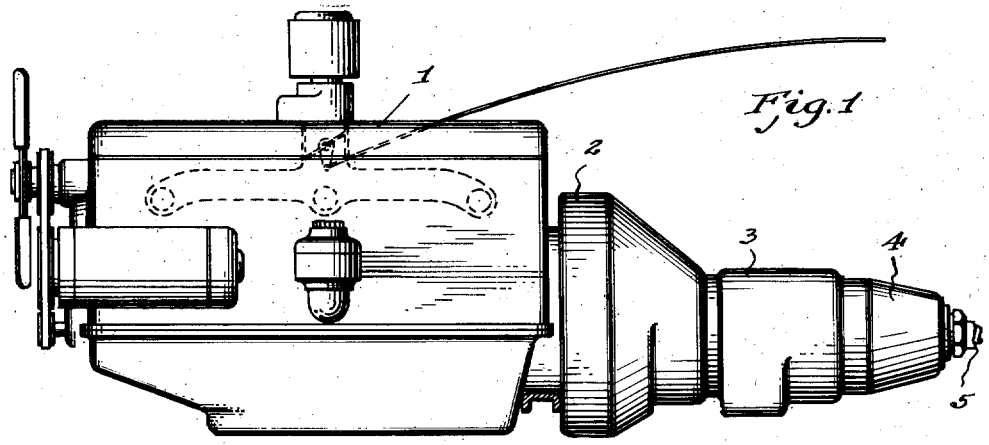
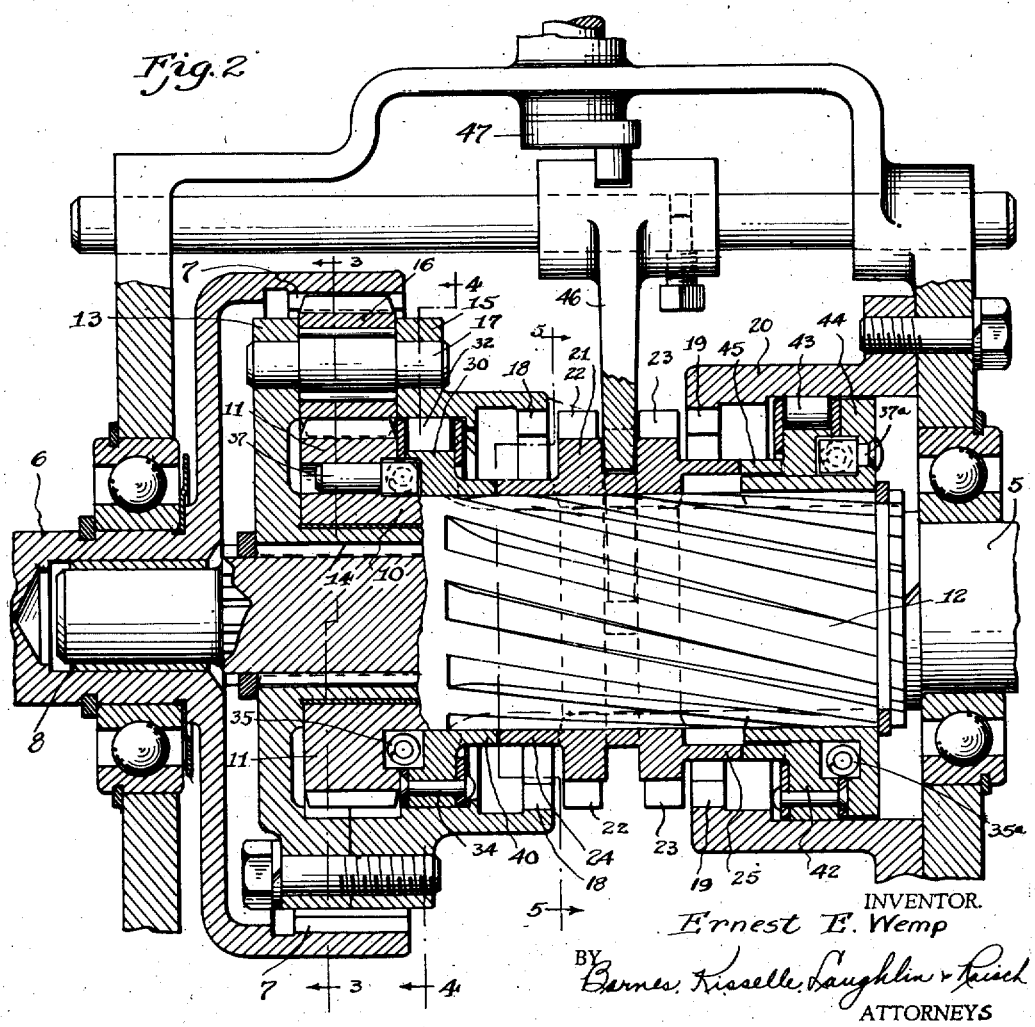
INVENTOR.
Ernest E. Wemp
BY Barnes, Kisselle, Raughlin & Reich
ATTORNEYS May 28, 1946. E. E. WEMP Re. 22,761
TRANSMISSION
Original Filed Aug. 23, 1939 9 Sheets-Sheet 2
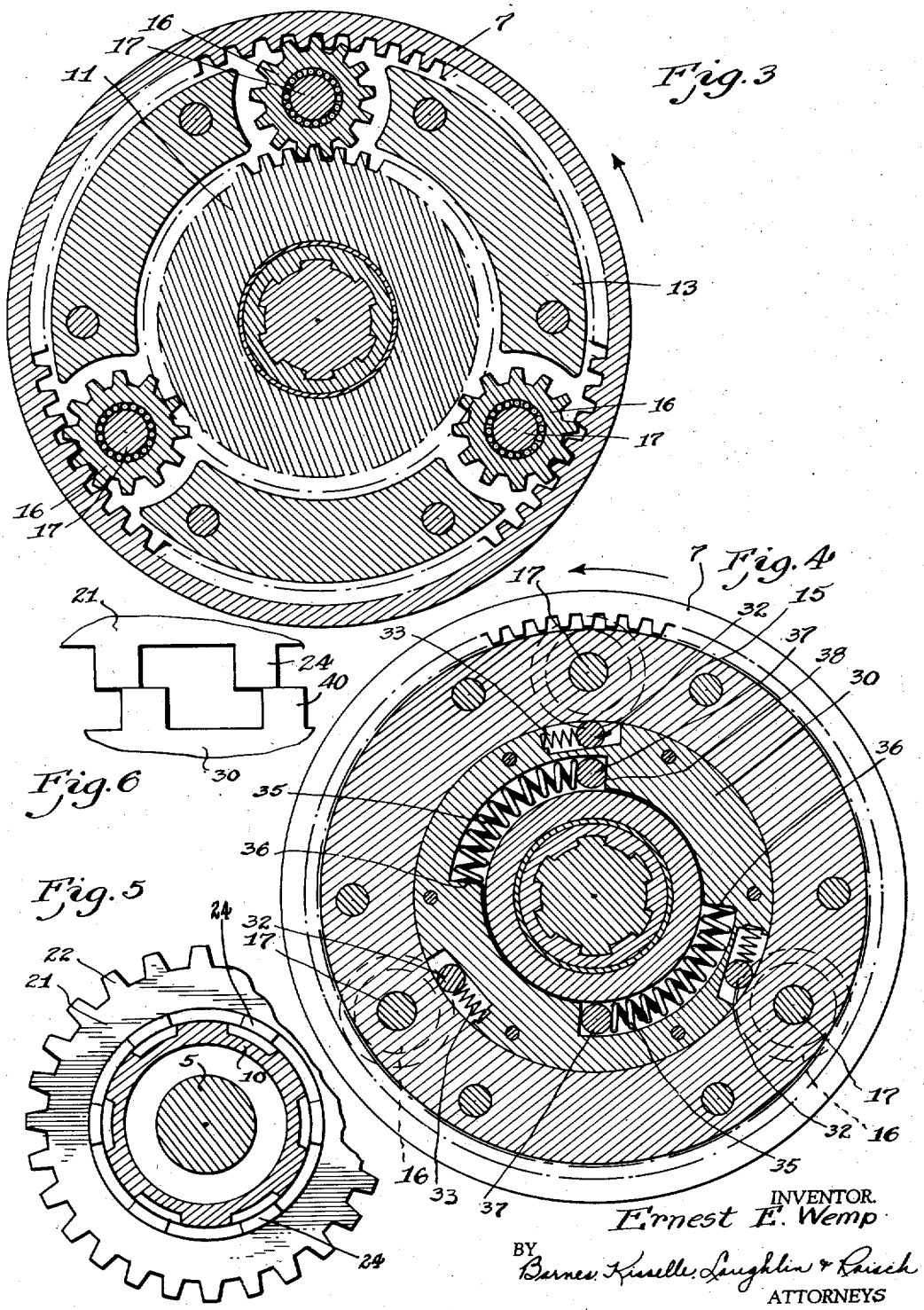
INVENTOR.
Ernest E. Wemp
BY Barnes, Kisselle, Laughlin & Raisch
ATTORNEYS

TRANSMISSION

Original Filed Aug. 23, 1939 9 Sheets-Sheet 3

INVENTOR.
Ernest E. Wemp
BY Barnes, Kisselle, Laughlin & Raisch
ATTORNEYS

TRANSMISSION

Original Filed Aug. 23, 1939 9 Sheets-Sheet 4

INVENTOR.
Ernest E. Wemp
BY Barnes, Kisselle, Raisch & Raisch
ATTORNEYS

May 28, 1946. E. E. WEMP Re. 22,761

TRANSMISSION

Original Filed Aug. 23, 1939 9 Sheets-Sheet 5

INVENTOR.
Ernest E. Wemp
BY Barnes, Kisselle, Raugh lin & Leich
ATTORNEYS

May 28, 1946. E. E. WEMP Re. 22,761

TRANSMISSION

Original Filed Aug. 23, 1939 9 Sheets-Sheet 6

INVENTOR.
Ernest E. Wemp

BY Barnes, Kisselle, Raugh & Reich
ATTORNEYS

May 28, 1946. E. E. WEMP Re. 22,761

TRANSMISSION

Original Filed Aug. 23, 1939 9 Sheets-Sheet 7

INVENTOR.
Ernest E. Wemp
BY Barnes, Kisselle, Raisch & Choate
ATTORNEYS

TRANSMISSION

Original Filed Aug. 23, 1939 9 Sheets-Sheet 8

INVENTOR.
Ernest E. Wemp
BY Barnes, Kisselle, Raugh, Lin & Raisch
ATTORNEYS

TRANSMISSION

Original Filed Aug. 23, 1939 9 Sheets-Sheet 9

INVENTOR.
Ernest E. Wemp
BY Barnes, Kisselle, Laughlin & Raisch
ATTORNEYS

Reissued May 28, 1946

Re. 22,761

UNITED STATES PATENT OFFICE 22,761

TRANSMISSION

Ernest E. Wemp, Detroit, Mich., assignor of five per cent to Clyde J. Smith, five per cent to Leah Kathleen Smith, twenty per cent to Lila A. Wemp, all of Detroit, Mich., and five per cent to Eleanor May Wemp, Los Angeles, Calif.

Original No. 2,371,564, dated March 13, 1945, Serial No. 291,574, August 23, 1939. Application for reissue October 4, 1945, Serial No. 627,109

29 Claims. (Cl. 74—259)

This invention relates to means for the transmission of forces from a driving member to a driven member and also from the driven member to the driving member.

The means may be in the nature of a transmission disposed somewhere in the power line between the engine and the traction wheels of a vehicle, such as an automotive vehicle. As is well known, the torque is delivered by the engine of an automotive vehicle when the engine is driving the vehicle, and the torque is in a direction from the traction wheels to the engine at certain times, as for example, when the throttle of an engine is controlled to tend to reduce its speed. This can also be true of other types of vehicles and of other mechanisms.

One of the objects of the invention is to provide a gearing or transmission capable of establishing different gear ratios between the driving and driven members through the means of dental engagement of certain of the parts. The term "dental engagement" is used to denote an engagement of teeth or similar irregularly formed elements on two or more members. It is also an object of the invention to provide an arrangement wherein the action of changing the gear ratio between the driving and driven members is obtained incident to the reversal of torque. When these two ideas or objects are combined the resultant structure may change the gear ratio between the driving and driven members through the means of a dental engagement effected by torque reversal. It will be seen, therefore, that in an automotive vehicle the gear ratio between the driving and driven members may be changed by the simple expedient of manipulating the engine throttle to cause a torque reversal.

Another object of the invention is the provision of a transmission, that is a device for transmitting power from one member to another, wherein a dental engagement for establishing a connection between the driving and driven members may be made and broken incident to reversal of torque, without regard to the employment of gears and the obtaining of different gear ratios. This arrangement may be arranged with a one-way drive coupling, to the end that upon a torque reversal the dental engagement is disestablished and a one-way drive or overrunning connection is provided. In an automotive vehicle this will facilitate the changing of gears in the gear change transmission. Also, in this arrangement upon torque reversal the parts to be brought into dental engagement are substantially synchronized at the time of such dental engagement; or stating it in other words, the dental engagement is effected substantially at the time of synchronization.

In accordance with the invention, an arrangement is provided whereby the different ratios between the driving and driven members may be effective to both change the ratio from a higher to a lower and from a lower to a higher ratio, and both by the same action of controlling the torque reversal. And this is accomplished without breaking the power line through the means of an instrumentality such as a clutch.

The arrangement of the invention is nicely adapted to be organized into what is commonly known as a planetary type of gearing or transmission which involves a sun gear and planetary gears, although the arrangement of effecting different ratios upon torque reversal may be employed without the planetary gearing.

A further object of the invention is an arrangement where a pre-selection may be made by an operator of the device to the end that when a torque reversal is effected the gear change between the driving and driven members may or may not be made as determined by the pre-selection. A still further object of the invention is the provision of a gearing or transmission of this type, in which the control is not only subject to torque reversal, but has an automatic characteristic obtained by the influence of centrifugal force. With this latter arrangement the pre-selection may be dispensed with.

The device of this invention generally may be termed a transmission, although it may be used in an automotive vehicle in conjunction with the already existing gear change transmission, and though the device itself embodies no gearing. Then, too, the invention is not limited to use on vehicles.

Different arrangements are shown in the accompanying drawings for carrying out the invention.

Fig. 1 is a general view illustrating an engine with the usual clutch housing and transmission housing.

Fig. 2 is a cross sectional view taken through a transmission of the planetary type and showing the invention.

Fig. 3 is a cross sectional view taken substantially on line 3—3 of Fig. 2.

Fig. 4 is a cross sectional view taken substantially on line 4—4 of Fig. 2 showing some of the control elements.

Fig. 5 is a cross sectional view taken substantially on line 5—5 of Fig. 2.

Fig. 6 is a lay-out showing abutment teeth for controlling dental engagement of some of the parts.

Figure 7:
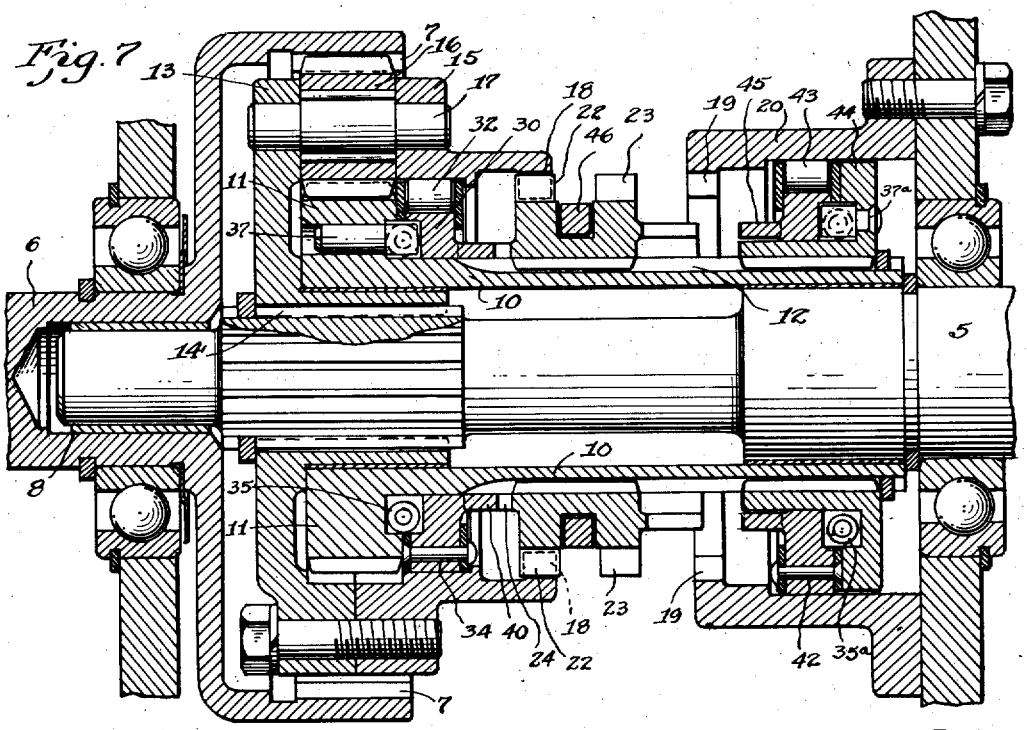
Fig. 7 is a view similar to Fig. 2 showing the gearing conditioned for a direct drive.

For the purpose of illustrating an environment in which this invention may be employed, an internal combustion engine is illustrated at 1 in Fig. 1 having the usual bell housing 2 for a clutch, a transmission housing 3 and an auxiliary housing 4 within which may be contained the gearing of the present invention. A driven shaft is shown at 5.

The gearing is generally illustrated in Fig. 2, a driving shaft or element being illustrated at 6 and having an internal gear member 7. The driven shaft may be piloted in the driving member 6 as illustrated at 8. Surrounding the driven shaft for free rotation thereon is a sleeve 10 having a so-called sun gear thereon, as shown at 11. The sleeve is provided with helical splines 12 the purpose of which will presently appear.

A carrier 13 is connected in driving relationship with the driven shaft as by means of splines 14, and it has an auxiliary part 15. Between the two parts 13 and 15 are disposed a suitable number of planetary gears or pinions 16 mounted on studs 17 and the teeth of which engage with those of the gear members 7 and 11.

The member 15 has an extending part equipped with teeth 18 for dental engaging purposes. Secured to a fixed part of a housing or the like is a fixed reaction member 20 having teeth 19 also for dental engagement purposes. Mounted upon the helical splines is a shiftable coupler or control member 21 in the form of a collar on the sleeve 10 and having teeth 22 and 23 for a dental engagement respectively with teeth 18 and 19. The control member also has extending elements constituting abutment teeth 24 and 25.

Mounted upon the sun gear sleeve so that it may oscillate or rock thereon, is what may be termed a clutch ring 30 having recesses therein as shown in Fig. 4 for the reception of rollers 32, each acted upon by a spring 33. The recesses are shaped so that the rollers are wedged between the bottom of the recesses and the adjacent circumscribing surface on the carrier member 15, thus forming a one-way drive connection. The rollers are confined between washers secured to the clutch ring as by means of rivets 34.

The clutch ring 30, however, is operably associated with the sun gear through the means of an arrangement which permits of a limited relative rotary movement. To this end the sun gear and clutch ring have circumferential recesses which match each other, and in the resultant chamber are coil springs 35. One of the washers which is attached to a clutch ring is notched or cut away to form shoulders 36 for confining the springs at one end, while studs 37, carried by the sun gear, abut the opposite ends of the springs. When the springs expand as shown in Fig. 4, the studs 37 may abut the shoulders 38 on the washer, but the washer, and therefore the clutch ring, as shown in Fig. 4, can shift clockwise relative to the sun gear, or the sun gear may shift counter-clockwise relative to the washer and clutch ring by the flexing of the springs. This movement, of course, is limited. The normal position of the parts is with the springs extended, as shown in Fig. 4. The clutch ring 30 has an extending part which projects toward the control member 21 and which has abutment teeth 40 for cooperation with the teeth 24, as shown in Fig. 6.

The clutch ring arrangement is substantially duplicated relative to the fixed reaction member 20. This brake ring is shown at 42 having one-way driving rollers 43 which may be of the same structure as the rollers 32 shown in Fig. 4. Fixed to the sun gear sleeve non-rotatably is a member 44 and between the ring 42 and member 44 is a spring and stud arrangement the same as the spring 32 and stud arrangement 37 and washer arrangement 30 shown in Fig. 4. The brake ring 42 has an abutment tooth arrangement 45 for cooperating with the teeth 25 on the collar 21, the same as is illustrated in Fig. 6.

Figure 8:
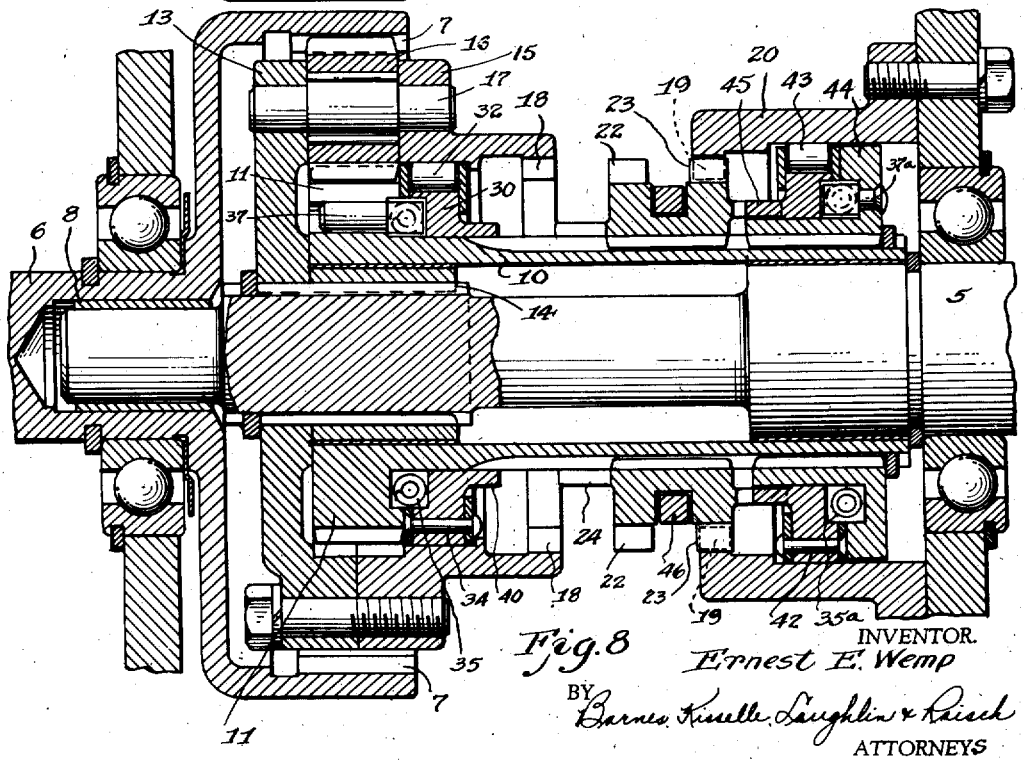
Fig. 8 is a view similar to Fig. 7 showing the gearing conditioned for a drive other than direct.
Figure 23:
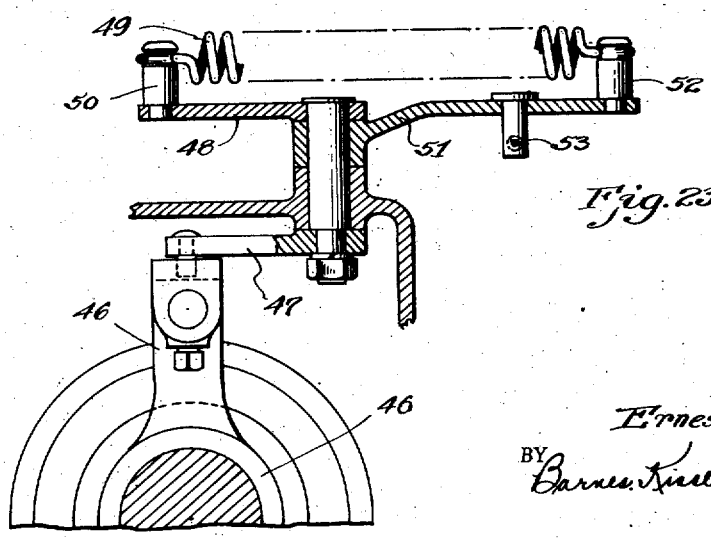
Fig. 23 is a view illustrating an arrangement for pre-selecting a load on the control element.

In the arrangement shown in Figs. 2, 7 and 8, the gearing may be controlled by a pre-selection made by the operator. To this end, a shifter fork 46 (Fig. 23) engages in the groove in collar 21. The fork is slidably mounted as shown and is shifted by an arm 47, which is rockably mounted with an arm 48. A spring 49 is connected to the arm 48 as at 50 and to a control arm 51 as at 52. An operable control such as a Bowden wire or the like may be connected to the arm as at 53. The arm 51 may be shifted at will to position the point of connection 52 to one side or the other of the pivotal center of the arms 47 and 48 so that in one position the spring tends to shift the fork and collar in one direction and in the other position it tends to shift the fork and collar in the opposite direction.

The operation of this form of the gearing is as follows: When the teeth 18 and 22 of the carrier and the control collar are in dental engagement as shown in Fig. 7, the driving member 7, the carriers 13 and 15, the collar 21 and the sun gear and its sleeve are all tied together, with the result that these parts rotate in unison and the driven shaft 5 may be driven by the driving shaft 6 with a 1 to 1 ratio. With the collar in the position shown in Fig. 8, at which time the teeth 23 and teeth 19 are in engagement, the sun gear is held stationary and the carrier is free. As a result, the driven shaft is driven at a speed lower than that of the driving shaft, inasmuch as the carrier revolves with the planetary pinions running around the sun gear. In this particular form, the helical splines 12 are of a right hand nature as shown in Fig. 2, this, however, depending upon the normal direction of rotation.

In considering now the making of a shift from low gear, which is the Fig. 8 position, to high gear, the Fig. 7 position, having in mind that the terms "low" and "high" are used to merely denote the relative arrangement: The driving member turns in the direction indicated by the arrow in Fig. 3, namely, counter-clockwise, as this figure is viewed, and the tendency at this time is for the sun gear to rotate in the opposite direction, namely, clockwise. The helical splines 12, therefore, tend to feed the collar 21 to the right. Therefore, the tendency is, in low gear when torque is coming from the driving member, to maintain the dental engagement of the control collar with the fixed reaction member. At this time the pre-selection mechanism may be positioned so that the spring 49 also places a force on the collar 21, tending to maintain the dental engagement with the fixed reaction member. Suppose now that the engine is driving the vehicle with torque being delivered from the engine: The operator may shift the control arm 51 so that the spring tends to shift the control collar 21 to the left. The tendency is to disengage the collar from the fixed reaction member. But this will not occur so long as the torque is from the driving member to the driven member. As the throttle of the engine is relieved, however, the engine and the driving member tend to decelerate, but the carrier continues to rotate with the driven member or vehicle. Therefore, the torque is reversed. Upon such reversal the tendency of the sun gear is to start to rotate with the driven member or counter-clockwise as Fig. 3 is viewed. The helical splines, together with the forces of the spring, substantially at the movement of the reversal, shift the control member out of dental engagement with the fixed reaction member, or in other words, from the Fig. 8 position to the Fig. 2 position. At this neutral position the teeth 24 on the collar strike the ends of the teeth 40 on the clutch ring 30 as shown in Fig. 6 so that movement of the collar is interrupted. At this time, with the driving member decelerating and the carrier and driven member continuing to rotate substantially uniformly or with slight deceleration, the sun gear, having been released from the fixed reaction member, accelerates from zero speed, and it will come up to a speed which synchronizes with that of the carrier, and then will tend to rotate faster than the carrier. It will be appreciated now that the clutch ring 30 moves substantially uniformly with the sun gear, as it moves from zero to a speed which substantially synchronizes with the carrier. The clutch ring, however, cannot overrun the carrier because at this time the one-way clutch residing in the rollers of 30 engage the carrier and clutch ring to thus, as Fig. 4 is viewed, prevent the clutch ring from rotating counter-clockwise relative to the carrier. The sun gear, however, may continue its acceleration beyond the speed of rotation of the carrier, which it may do because of the studs 37 shifting counter-clockwise relative to the other parts shown in Fig. 4, thus compressing the springs 35. Thus the sun gear, together with the collar, has a rotary movement relative to the ring 30, and accordingly, the teeth 24 rock or rotate relative to the teeth 40 on the ring until they can ride past each other or out of a blocking position. As soon as this happens the forces on the collar which come from the spring and the helical splines 12 shift the collar further to the left or from the neutral position of Fig. 2 to the position shown in Fig. 7, thus causing a dental engagement of the teeth between the collar and the planetary gear carrier. Accordingly, it will be noted that this dental engagement is effected substantially at the time of synchronization of the carrier and the sun gear. As a result there is a nicety of dental engagement without clashing of the teeth.

Now, when the torque is again reversed by opening the engine throttle, the parts are tied together so that the relationship between the driving and driven members is 1 to 1. With the torque coming from the driving member at this time the tendency of the helical teeth is to shift the collar to the right or out of dental engagement with the carrier, but this is prevented for two reasons; one is the pressure of the spring, and the other is the friction of the mating splines and dental teeth. The angle of the helical splines is selected so that the axial component of the torque load is almost balanced or negated by the frictional resistance of the mating splines and the resistance of the dental teeth to slide axially under load, so that a comparatively light spring pressure is required to maintain dental engagement of the parts even though the thrust forces induced by the helix angle of the splines tend to cause a separation of the dental teeth.

Reverting again to the Fig. 8 position or low gear: If the pre-selector is positioned so that the spring places a load on the collar which is to the right, thus tending to maintain the dental engagement with the fixed reaction member, a reversal of torque will not cause a change of the gearing as above described. Such reversal causes the helical teeth to tend to feed the collar to the left, or out of dental engagement with the fixed reaction member, but the spring prevents this.

Now considering again Fig. 7: With the torque being delivered from the driving shaft to the driven shaft, the helical splines tend to shift the collar to the right to break the dental engagement, but as explained above this is prevented by the load on the parts and the spring. The greater the torque the greater the tendency of the splines to shift the collar to the right, but also the greater the load. Very light torque results in a very light shifting tendency, with the result that the dental engagement with the carrier is maintained. If, however, it is desired to effect a change of gearing, the operator may swing the control so that the over-center spring tends to shift the collar to the right. This causes the collar to shift from the Fig. 7 position to the Fig. 2 position. At this time, with the engine and driving shaft decelerating and the carrier moving with the driven shaft, the sun gear is decelerating. The movement of the collar to the right, however, is stopped by reason of the end to end engagement of the teeth 25 and 45. The forces delivered to the sun gear through the planetary gears tends to cause the sun gear to slow down and approach a zero speed and tend to run in a negative direction. The brake ring 42 which normally moves with the sun gear, is prevented from any negative movement by the overrunning brake members 43, but the torque on the sun gear causes some negative movement which is permitted by reason of the studs 37a shifting against the action of the springs 35a. This is the same as though the studs 37 shift counter-clockwise as viewed in Fig. 4. This negative movement of the sun gear carries the collar with it, and the teeth 45 and 25 are disaligned, thus permitting the collar to shift to the right and ultimately to the Fig. 8 position. The torque, when coming from the driving member, tends to shift the collar to the right. It will therefore be seen that the collar is given a dental engagement with the fixed reaction member substantially when these two parts are synchronized, or in other words, when the collar, and therefore the sun gear, are substantially at zero speed. The parts are now in low gear and will remain therein until a pre-selection is made by shifting the spring so that it exerts forces on the collar, tending to shift it to the left.

Briefly reiterating, when the torque is from the driving member, the helical splines tend to shift the collar 21 to the right and when the torque is reversed the helical splines tend to shift the collar to the left. Accordingly, with torque being delivered from the driving member the collar tends to accept dental engagement with the fixed reaction member and tends to reject dental engagement with the carrier. With the pre-selector spring set to oppose the rejection from the carrier, the dental engagement in Fig. 7 will be maintained. When the pre-selector spring is set to aid the rejecting action, the collar will shift to the Fig. 2 position; then the sun gear will decelerated, and when it approximates zero speed and tends to run negative, the blocking teeth become disaligned and the collar shifts from the Fig. 2 position to the Fig. 8 position and the dental engagement with the fixed reaction member is established substantially at synchronization. This condition will be maintained until the pre-selector spring is set to place a load on the collar tending to shift it to the left. Then by merely effecting a reversal of torque the collar shifts out of dental engagement with the reaction member to the Fig. 2 position where its movement is blocked by the abutment teeth. The sun gear and collar now accelerate, and as the collar tends to overrun the carrier the blocking teeth become disaligned and the movement to the left continues and the dental engagement with the carrier is established substantially when the collar and carrier are synchronized. Thus the structure effects a change from a low gear ratio to a high gear ratio, or vice versa, without breaking the power line as by means of a clutch or the like. The blocking teeth 24 and 40, and 25 and 45, may be so arranged that the blocking discontinues when the corresponding teeth for dental engagement, namely, 18 and 22 on the one hand and 19 and 23 on the other hand, are in position for a proper dental engagement.

In Figs. 9 to 13, inclusive, an arrangement is shown wherein some of the control is effected by centrifugal force. In this form many of the parts are the same as those parts previously described, and in order to avoid duplicate description these parts are given the same reference characters with a prime mark. These parts are the driving member, the sun gear, the planetary gears and their carrier, the clutch ring, and such small parts as are related thereto. The driven member is shown at 50 and to which the carrier 13'—15' is secured. The sun gear has a sleeve with right hand helical splines 12' disposed over the extending shaft of the driven member, and it has a ring 51 affixed to one end. The fixed reaction member takes the form of a ring 52 secured to a suitable part of a housing or the like 53, and between the ring 51 and ring 52 is a one-way brake structure residing in rollers 54 which prevents the sun gear from rotating backward or in a negative direction.

The coupler collar 55 has teeth 56 for dental engagement for the teeth 18' of the carrier. This control collar is mounted on the helical splines. In this form the control collar and the clutch ring 30' have abutment teeth as illustrated in the lay-out views, Figs. 12 and 13. The teeth on the collar are shown at 58 and those on the clutch ring at 57, and they have angular or inclined ends as illustrated.

The control collar includes a centrifugal arrangement residing in a housing comprising a part 60 secured to the collar as shown, and a part 61 keyed to rotate with the part 60, but relatively axially movable. Within the housing are centrifugal weights which may take the form of segments 62 held radially inwardly by a circumscribing coil spring 63. Each weight has a bumper or buffer of rubber or the like 64, and between the weights and the housing members are roller elements such as balls 65 confined in facing recesses constituting pockets, the recesses being shown at 66. The housing member 61 is prevented from shift to the right as it butts up against the member 51 in turn held by a suitable ring, and the housing member 60 and the control collar are shiftable.

Figure 12:
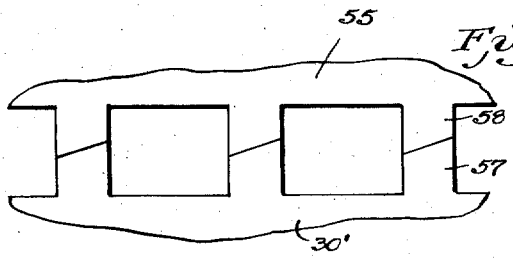
Fig. 12 is a lay-out illustrating abutment teeth used in the centrifugally controlled form.
Figure 16:
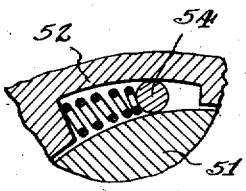
Fig. 16 is a sectional view taken substantially on line 16—16 of Fig. 9.
Figure 13:
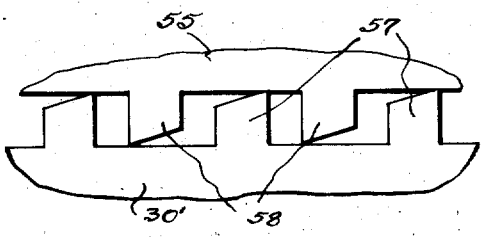
Fig. 13 is a view similar to Fig. 12 showing the abutment teeth out of abutment relation.
Figure 10:
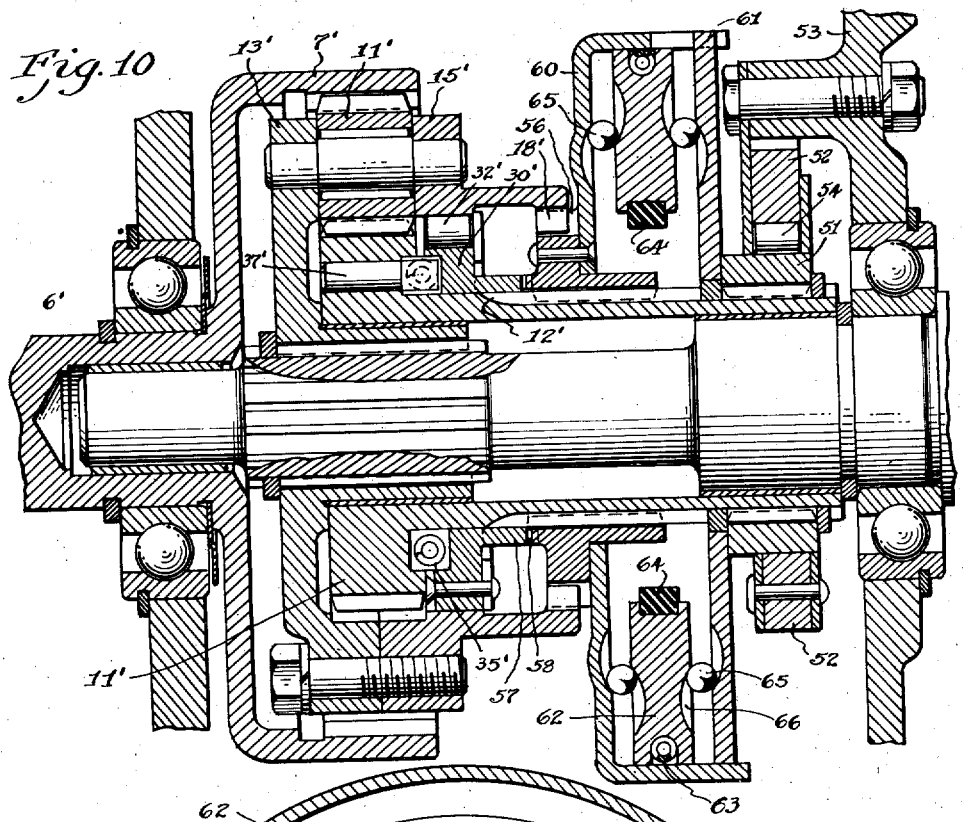
Fig. 10 is a view similar to Fig. 9 showing the centrifugal elements effective.
Figure 11:
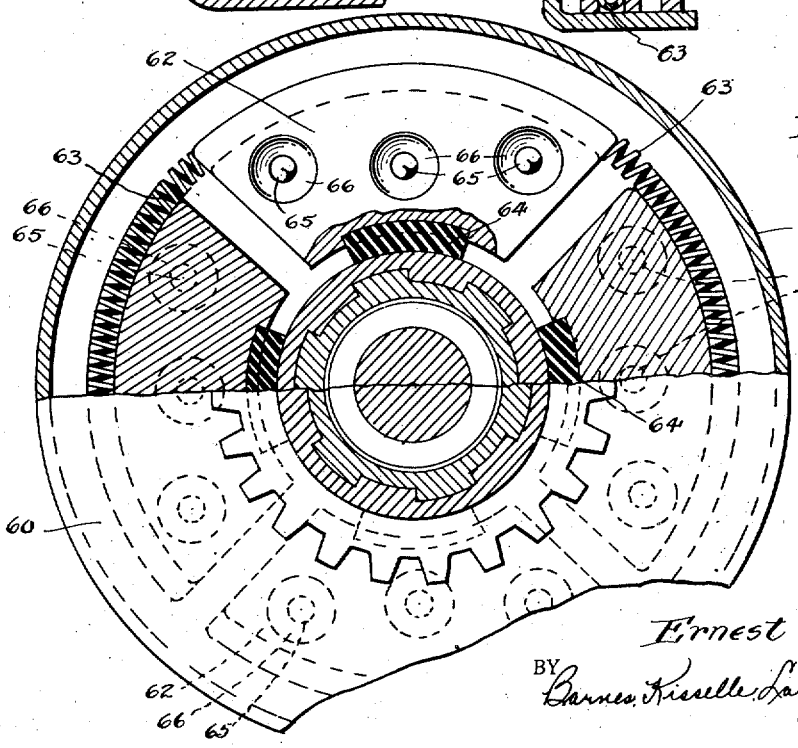
Fig. 11 is a sectional view taken substantially on line 11—11 of Fig. 9.

The operation of this form of the invention is as follows, this form being responsive both to the torque reversal and to speed of rotation: With the parts in the position shown in Fig. 9 the drive is transmitted from the driving member to the driven member through the gearing. The driving member is revolving, the sun gear is held from negative rotation or backward rotation by the overrunning brake rollers 54. The carrier is revolving around the sun gear at a speed lower than that of the driving member. Upon reversal of torque, as by closing the engine throttle, the driving member begins to decelerate while the carrier continues to rotate with the driven member. This causes the sun gear to accelerate from zero. When the torque is from the driven member the helical splines tend to shift the controlling member 55 to the left, and this tendency, or the centrifugal action, or both, places an axial load to the left on this member. However, the abutment teeth come into engagement, as indicated in Fig. 12, to prevent dental engagement between 18' and 56. As the control member tends to overrun the ring 30', the studs 37' (see Fig. 4), compress the springs 35' as the rollers 32' prevent the clutch ring from rotating faster than the carrier, with the result that the abutment teeth become disaligned as indicated in Fig. 13, thus allowing the member 55 to shift into dental engagement with the carrier. The parts are now in the position shown in Fig. 10, with the driving member, the carrier and sun gear all locked together for a direct drive. The centrifugal force moves the weights outwardly and spreads the housing as indicated.

Figure 9:
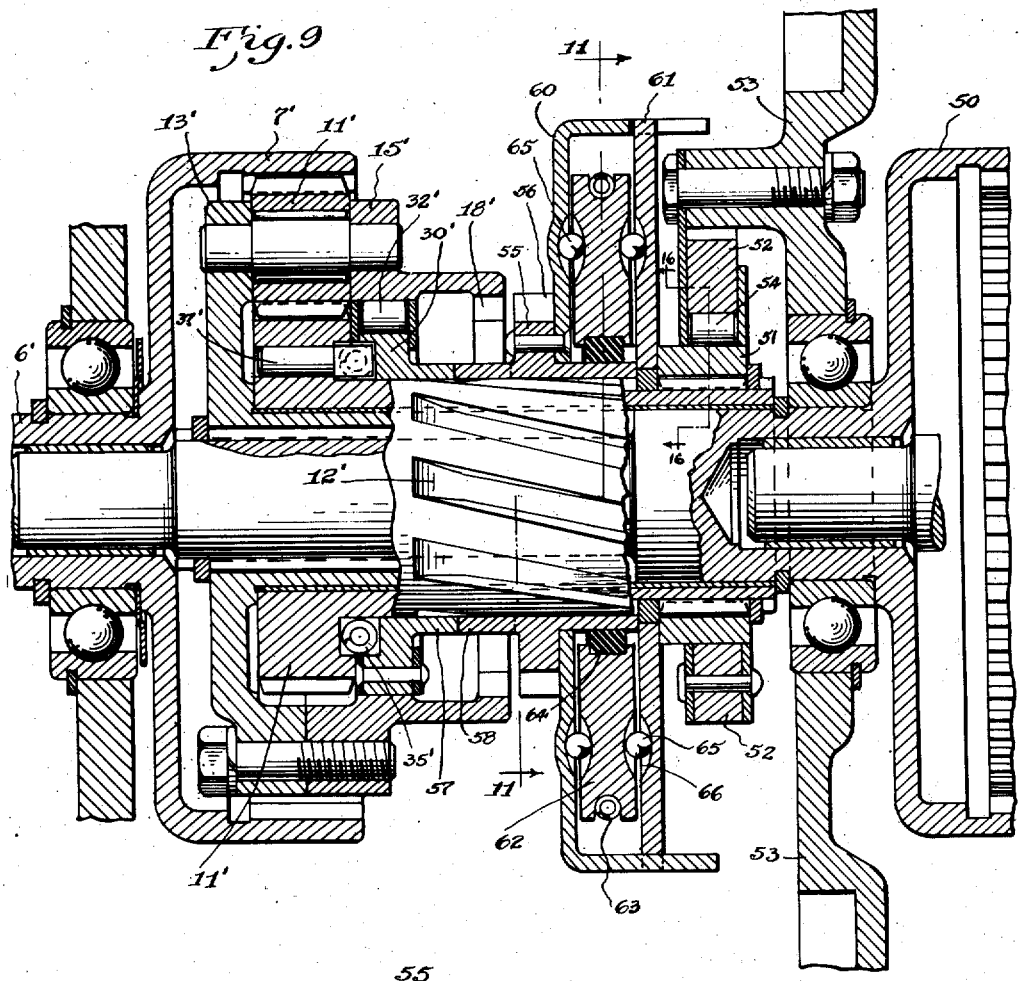
Fig. 9 is a sectional view showing a different form of the invention and which embodies a centrifugal control.

So long as the torque is coming from the engine and so long as the speed of rotation is adequately high the parts will remain in this high gear relationship. The helical splines tend to disengage the dental engagement at 18′ and 56, but this is prevented by the centrifugal force and the load on the parts. A high torque places a high load on the parts. A low torque places a low load on the parts. When the R. P. M. becomes sufficiently low that the centrifugal weights do not exert enough force to maintain the dental engagement shown in Fig. 10, the control member shifts automatically out of dental engagement with the carrier and the sun gear becomes locked against negative rotation relative to the fixed reaction member, and the parts are then in low gear relationship, as shown in Fig. 9. Thus the parts will shift from high gear relationship to low gear relationship at a relatively high R. P. M. under high torque, but will not shift from high gear relationship to low gear relationship under low torque until a relatively low R. P. M. is attained. Thus while a reversal of torque is necessary to effect a shift from low gear relationship to high gear relationship, the high gear relationship will maintain until the conditions of torque and speed require a shift back to low gear relationship. The reason for the inclined ends on the abutment teeth 58 and 57 is to assure a separation of the teeth 18′ and 56 when a shift is made from high to low gear relationship. As the dental engagement is broken the relative movement between the clutch ring and the sun gear takes place incident to the release of the compression on the springs 35′. The inclined faces of the abutment teeth strike each other and the collar is cammed or given a push, so to speak, away from the carrier.

Figure 14:
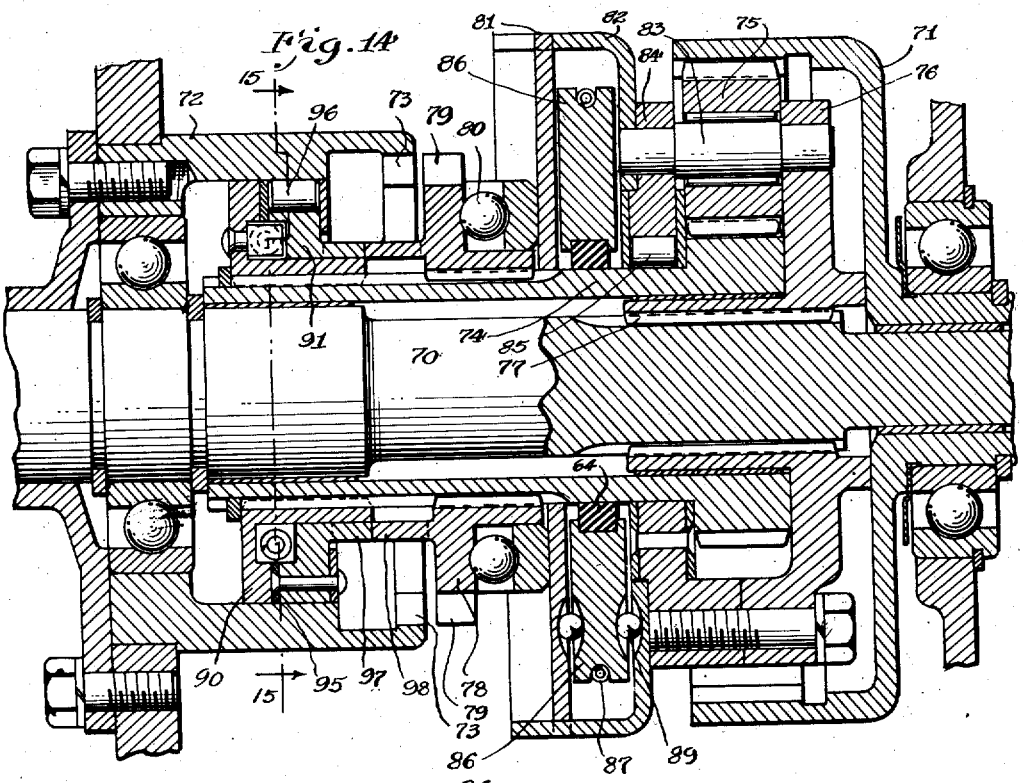
Fig. 14 is a sectional view illustrating another arrangement of the invention.
Figure 15:
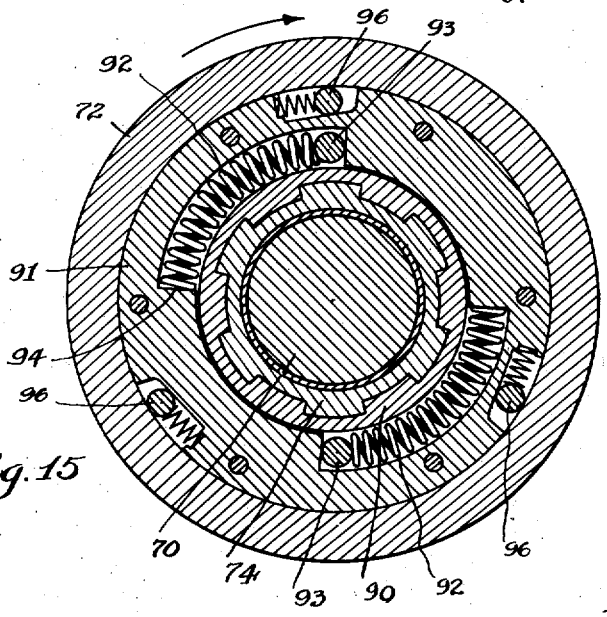
Fig. 15 is a sectional view taken substantially on line 15—15 of Fig. 14.

Fig. 14 shows an over-drive arrangement where, in one condition, the parts are in a 1 to 1 relationship and in another the driven member is rotated faster than the driving member. Also, this form shows the centrifugal control. In this form the driving member is at 70, the driven member in the form of an internal gear is at 71, a fixed reaction member is at 72 having teeth 73, the sun gear and its sleeve are illustrated at 74, while the carrier for the planetary pinions 75 is shown at 76, the carrier being splined as at 77 to the driving member.

A coupler collar 78 has teeth 79 and an antifriction bearing 80 is between housing member 81 of the centrifugal unit and the collar. The housing member 81 is slidably fastened to a housing member 82 which may be mounted upon the pinion studs 83 to rotate with the carrier and driving member. A ring 84 also rotates with the driving member, and between this ring and the sun gear is a one-way clutch which may reside in overrunning clutch rollers 85, which prevents the sun gear from overrunning the carrier.

Within the housing 81—82 are centrifugal weights 86 which may be like those previously described normally retrained inwardly by a coil spring 87 and operating on balls and recesses 89 to spread the housing. The antifriction bearing 80 takes care of the relative rotation between the carrier and the sun gear.

Keyed to one end of the sun gear sleeve is a member 90 associated with a brake ring 91 through the means of coil springs 92 and abutments in the form of studs 93 on the member 90 and abutments 94 cut out of a washer 95 on the brake ring. Between the brake ring and the fixed reaction member 72 is an overrunning brake comprising rollers 96. The brake ring 91 and the control member 78 have cooperating abutment teeth 97 and 98 corresponding to the abutment teeth 58 and 57 as shown in Figs. 12 and 13.

Figure 16A:
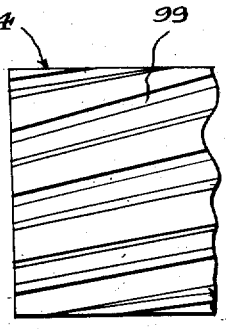
Fig. 16A is a fragmentary elevational view of the sun gear sleeve shown in Fig. 14.

The splines on the sun gear upon which the control member 78 is mounted are such that when the torque is from the driving member the tendency is to shift the control member to the right to disengage the dental connection. To this end the helical splines are of a left hand nature as shown at 99 in Fig. 16A.

This arrangement operates as follows: With the parts in the position shown in Fig. 14, the drive is a direct 1 to 1 ratio. The carrier and planetary gears rotate with the drive shaft 70 and the load on the sun gear tends to cause it to overrun the carrier which is prevented by the overrunning clutch members 85. Therefore, the driven member 71 is caused to rotate in a 1 to 1 ratio with the driving member. This continues with torque delivered from the driving member until the speed of rotation reaches a point where the centrifugal force tends to cause the weights to shift outwardly, but the abutment teeth prevent this action as they are in abutting relationship. Upon torque reversal so that the drive comes from the driven member, and with the carrier and driving member decelerating, the sun gear runs negative relative to the carrier. In fact the sun gear will tend to run backward relative to the fixed reaction member 72. However, the ring 91 is prevented from backward movement by the brake rollers 96. This produces relative movement between the collar and the clutch ring, bringing the abutment teeth to a position where they may interengage with each other and the centrifugal weights then urge the control member 78 to the left to establish the dental engagement with the fixed reaction member 72. Again this occurs when the control collar is substantially synchronized with the reaction member, or in other words when it is substantially at zero speed. Under these conditions the sun gear is held locked against rotation, and the driving member may now drive the driven member through the gearing, with the driven member rotating faster than the driving member. This condition will maintain until torque and speed are such that a change of gearing may be made. The tendency is for the splines 99 to expel the control member 78 from dental engagement with the fixed reaction member. As long as the centrifugal force resists this expelling tendency, the parts will remain in the over-drive relationship. At high torque, the change is made at a higher R. P. M. than at low torque, because the lower the torque the lower the centrifugal force needed to maintain the dental engagement. When the dental engagement is broken, the sun gear tends to pick up speed but is prevented from overrunning the carrier by the overrunning clutch rollers 85, with the result that the sun gear, carrier and driven member are tied together for a direct drive.

Figure 17:
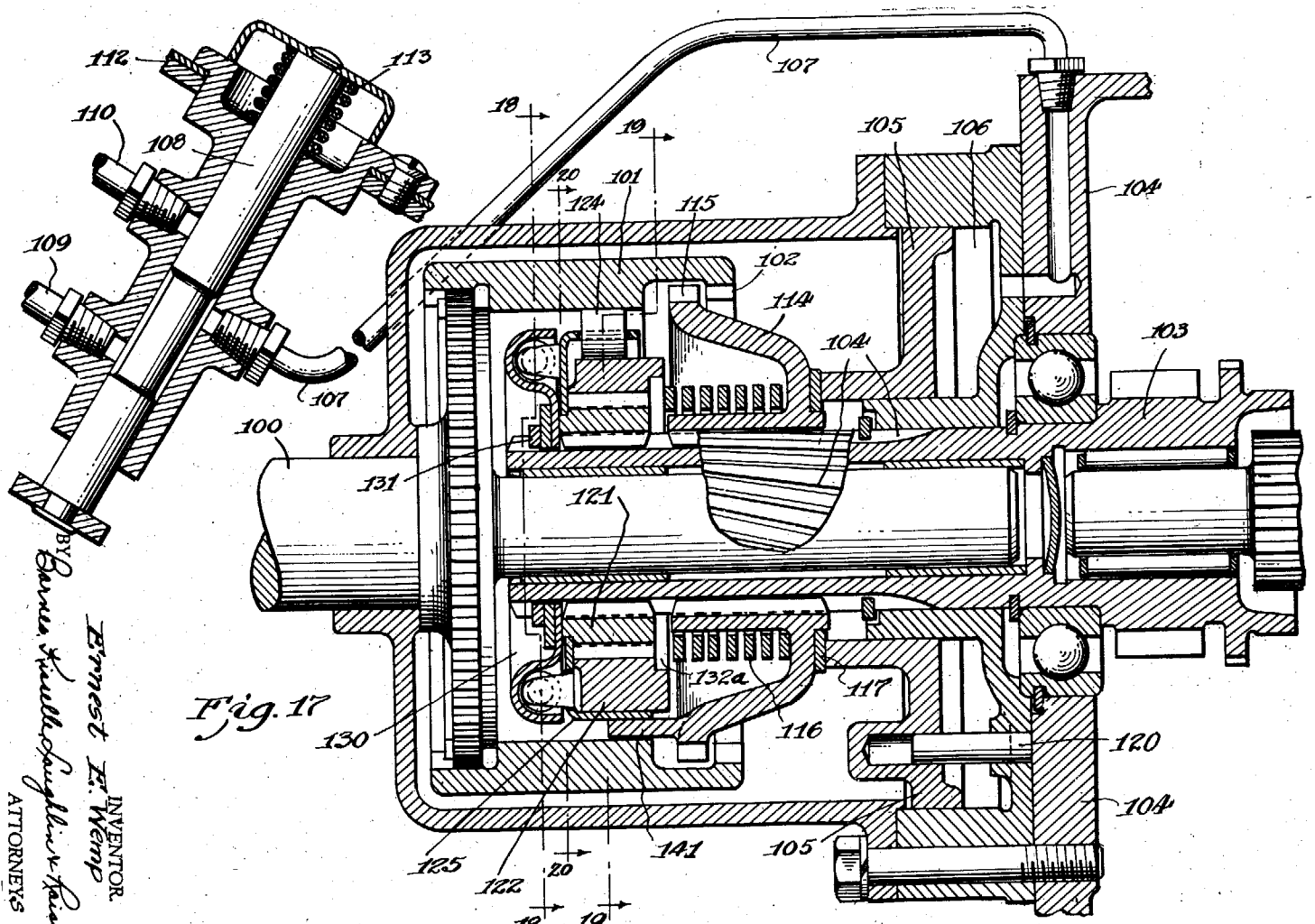
Fig. 17 is a cross sectional view illustrating a modified form which involves no gearing.
Figure 18:
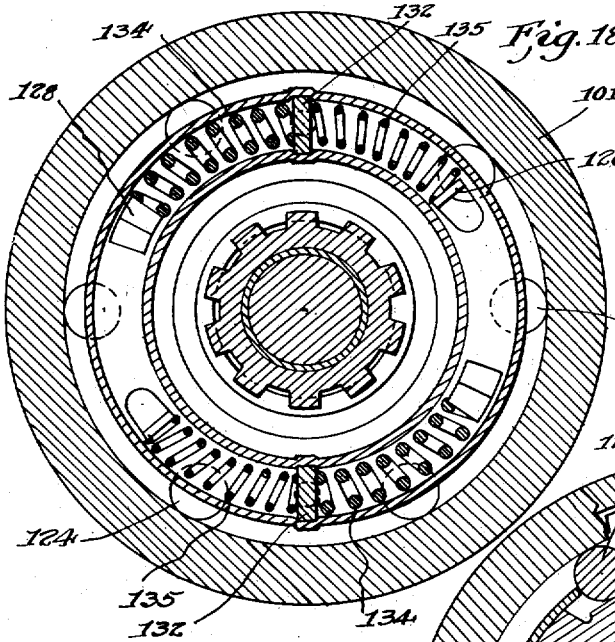
Fig. 18 is a sectional view taken substantially on line 18—18 of Fig. 17 showing some of the controlling elements.
Figure 21:
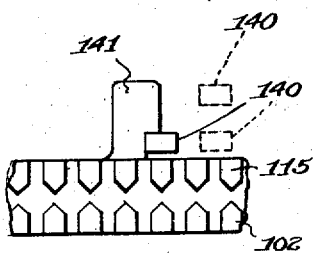
Fig. 21 is a lay-out illustrating the teeth for dental engagement and the abutment teeth.
Figure 19:
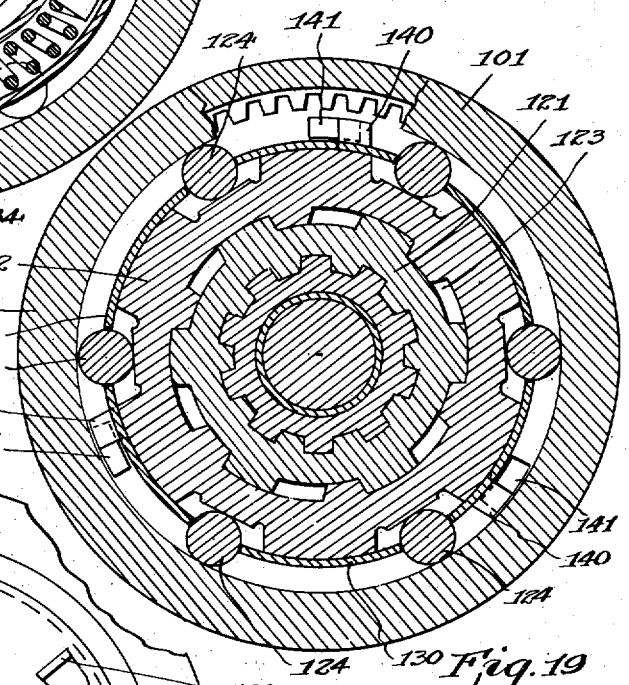
Fig. 19 is a cross sectional view taken substantially on line 19—19 of Fig. 17 showing the one-way clutching arrangement.
Figure 20:
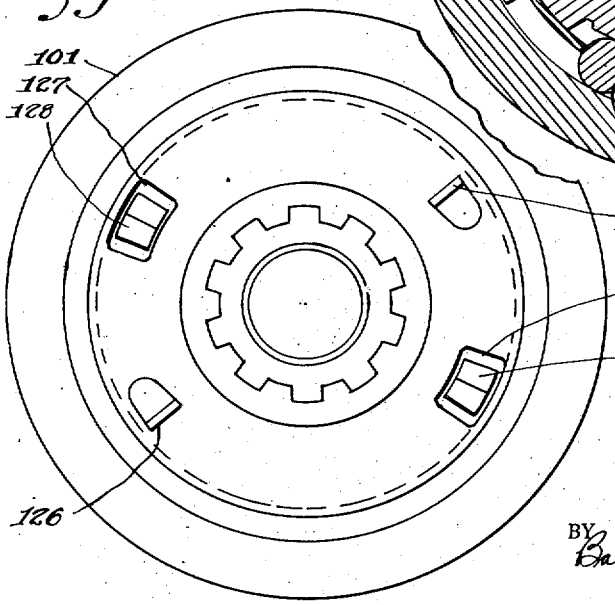
Fig. 20 is a sectional view taken substantially on line 20—20 of Fig. 17 showing certain structural features.

In the forms shown in Figs. 17 to 21, inclusive, there is an arrangement for the breaking or the establishing of a dental connection incident to reversal of torque independently of the existence of gearing. In this form the driving member 100 is shown as having an element 101 with teeth 102. A driven member 103 may be an element which extends into a case 104 of a gear change transmission, and in fact the member 103 may be one of the elements in such gear change transmission. The driven member 103 is provided with helical splines 104 which are of a right hand nature, as illustrated, where the direction of rotation, as Figs. 18 to 20 are viewed, is clockwise.

As a means facilitating the control of this arrangement there may be an annular piston 105 slidably mounted on an extension of the transmission case, thus forming an annular chamber 106 to which a pressure line 107 connects. A control valve 108 is arranged to connect the line 107 either to a pressure line 109 or an exhaust line 110 depending upon the positions of the control valve. In an automotive vehicle the line 109 may connect to the pressure lubricating system of the engine while the line 110 may lead back to the sump, and the valve may be mounted upon the floor or toe boards 112 of the vehicle. When the valve is pushed down in the position indicated, oil under pressure enters the chamber 106, and when the valve is permitted to shift back by its spring 113, the line 107 is connected to the relief line 110.

A driven coupler element 114 has teeth 115 and it is mounted upon the helical splines and is acted upon by a spring 116, while the piston functions on the driven element through the means of a thrust bearing 117. The piston may be held from rotation by one or more pins 120.

A hub-like element 121 is non-rotatably connected to the driven member 103 as by means of splines as shown in Fig. 19, while a ring 122 which may be called a clutch ring has a loose connection with the hub 121 as by means of loose splines as shown at 123 in Fig. 19. The clutch ring is formed with recesses to receive overrunning clutch rollers 124. These rollers are mounted in a cage or retainer 125, which is provided with axially extending abutments 126. The cage is also provided with openings 127 through which extend abutments 128 on the ring 122.

A spring retainer 130 is non-rotatably secured to the driven member 103 and the several parts are held assembled by a snap ring 131. In fact the spring 116 reacts through a washer 132A through the hub-like element 121 and eventually to the holding ring 131. The retainer 130 is provided with fixed partitions or abutments 132, and positioned between each abutment and the abutments 128 on the clutch ring are springs 134. Also positioned between the abutments 132 and the abutments 126 on the roller cage are springs 135.

It will be readily appreciated from a consideration of Figs. 18 and 19 that the springs 134, considering the parts at rest, tend to urge the clutch ring counter-clockwise, or in other words reverse to the direction of rotation of the parts during operation. It will also be seen that the springs 135, which may be quite light, urge the roller retainer in a clockwise direction, or in other words, in a direction which tends to cause the rollers to wedge into driving engagement between the driving member 101 and the clutch ring 122.

The clutch ring 122 is provided with lugs 140 which project therefrom, while the driven element 114 is provided with hook-like elements 141. These lugs and hook-like elements constitute abutment teeth.

Figure 22:
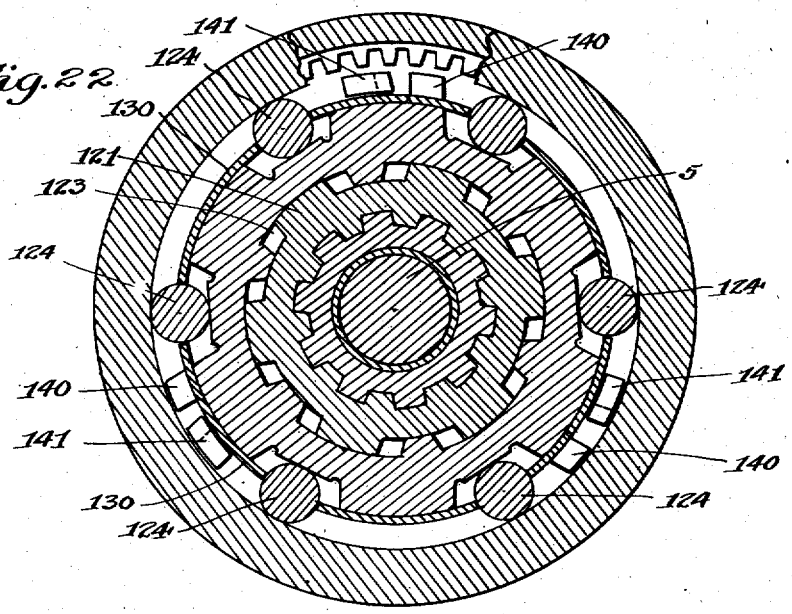
Fig. 22 is a cross sectional view similar to Fig. 19 but showing the parts in a different relation.
Figure 24:
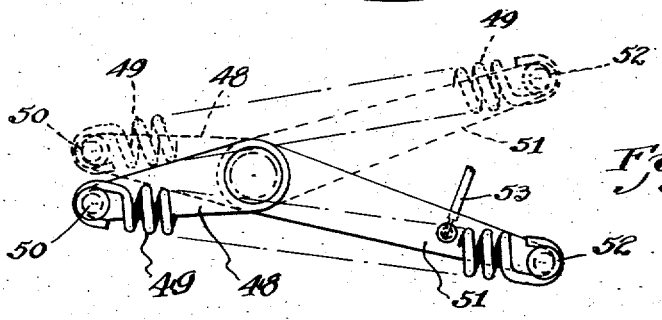
Fig. 24 is a view illustrating the over-center spring arrangement of Fig. 23.

The operation of this structure is as follows: The normal condition when the parts are coupled for driving is with the teeth 102 and 115 in dental engagement. The spring 116 urges the member 114 to the right as Fig. 17 is viewed. The drive is then from the member 101 through member 114 to 103. The right hand helical splines also place a load to the right on the member 114. Upon torque reversal the parts remain in this locked position. If, however, the valve 113 be operated to permit fluid pressure to enter the chamber 106, a load to the left is placed on part 114, but this load is not sufficient to cause any action as long as the torque is being delivered from the driving member. Upon torque reversal, however, which would take place when the throttle of the vehicle engine is closed or partially closed, the driven member 103 starts to drive member 114 and the helical splines tend to shift the member 114 to the left, and this action, with the supplemental action of the fluid pressure, causes the member 114 to shift to that position shown in Fig. 17 so that the teeth 115 and 102 are disengaged. At this moment the relative positions of the hub element 121 and the ring element 122 may be substantially as illustrated in Fig. 22, or in other words with the ring element rotated somewhat clockwise relative to the hub element, in which condition the springs 134 are stressed. As soon as the driving element 101, in its deceleration, releases the grip across the rollers 124, the springs 134 cause the ring element 122 to shift rotatably relative to the hub element, or from the Fig. 22 position to the Fig. 19 position. Just prior to this shift, however, the abutment hooks 141 are positioned to the left so that they lie along side the abutment teeth 140 on the clutch ring, as shown in Fig. 22, and as illustrated in dotted lines in Fig. 21. Thus the springs in rocking the ring 122 counterclockwise as Fig. 19 is viewed, causes the teeth 140 to engage behind the abutment teeth 141 as shown in full lines in Fig. 21. Accordingly, the driving member 101 may decelerate or come to rest while the driven element 103 may rotate faster or overrun the same. This condition will exist even in the absence of fluid pressure because of the engagement of the abutment teeth which hold the member 114 to the left with the spring 116 flexed.

However, when the torque is reversed and the driving element is accelerating, it first comes up substantially to the speed of the rotation of the clutch ring 122 and the overrunning clutch members take hold. The ring 122 is, therefore, rotated clockwise relative to the hub element or from the position in Fig. 19 to the position of the type as illustrated in Fig. 22, and this releases the abutment teeth so that the spring 116 shifts the element 114 to the right for a dental engagement at 102—115. This, of course, occurs only when the fluid pressure is relieved. In the clockwise movement of the ring 122 relative to its hub, the springs 134 are again compressed and maintained compressed at all times of the locked up condition, or in other words, a dental engagement at 102—115. It will be observed that the dental engagement at 102—115 occurs substantially at the time of synchronization of the driving and driven members. Thus the teeth slide quietly into engagement. The amount of rotation of the ring 122 relative to the hub 121, and therefore the member 114, is preferably such that there is a possibility of a dental engagement at 102—115 at several different points, or in other words, between several sets of teeth. Therefore, if for any reason the dental engagement for the first position is passed the second or subsequent third positions of dental engagement will become effective. Accordingly, the dental engagement is disestablished substantially as the parts are synchronized upon torque reversal, and the dental engagement is established substantially as the parts are synchronized upon torque reversal.

This arrangement may be used in a vehicle for the changing of the gears in a gear change transmission. By depressing the valve to the position indicated and decelerating the engine, the driven member 103 is freed and the gears in the transmission 104 may be changed. In an intermediate gear, the operator may hold the valve in the position shown and the engine accelerated to drive the vehicle in such intermediate gear, and in this case the fluid pressure prevents the dental engagement. The drive, however, is then through the overrunning rollers 124 through the clutch ring 122, hub member 121, to the driven member 103. Thus an operator may go through the entire range of gear changes while holding the parts in the freewheeling position, due to the position of the valve, and then finally when high gear is attained relieve the valve for the dental engagement and the direct locked up drive.

I claim:

1. In a torque transmitting device, driving and driven members and toothed parts arranged to be brought into and out of dental engagement, means tending to shift one of the parts for such dental engagement substantially upon reversal of torque, said one part being rotatable, a ring mounted for oscillation relative to the shiftable toothed part, abutment teeth on the ring arranged to block the movement of said part and prevent dental engagement, and means operable by the other of the said toothed parts substantially as the two toothed parts come into synchronization for rocking the ring to shift the abutment teeth out of blocking position.

2. In a torque transmitting device, driving and driven members and toothed parts arranged to be brought into and out of dental engagement, means tending to shift one of the parts for such dental engagement substantially upon reversal of torque, said one part being rotatable, a ring mounted for oscillation relative to the shiftable toothed part, abutment teeth on the ring arranged to block the movement of said part and prevent dental engagement, said ring being arranged to be operated rotatably relative to the shiftable toothed part by the other one of the said toothed parts substantially when the two toothed members come into synchronization to shift the abutment teeth out of blocking position for dental engagement.

3. In a torque transmitting device, driving and driven members and toothed parts arranged to be brought into and out of dental engagement, means operable incident to torque reversal tending to shift one of the toothed parts into dental engagement with the other, said one toothed part being rotatable, said shiftable toothed part having abutment teeth thereon, an element having abutment teeth thereon normally rotatable with said one part and positioned so that the abutment teeth are substantially engageable to prevent dental engagement, and means operable by the other one of said toothed parts substantially when the two toothed parts come into synchronization to shift the element and disengage the abutment teeth.

4. In a torque transmitting device, driving and driven members and toothed parts arranged to be brought into and out of dental engagement, means operable incident to torque reversal tending to shift one of the toothed parts into dental engagement with the other, an element mounted on and for oscillation relative to the shiftable toothed part, the shiftable toothed part and said element having abutment teeth, spring means normally holding the element so that the abutment teeth strike each other to prevent dental engagement, and means operable by the other one of said toothed parts substantially upon the synchronization of the two toothed parts to oscillate said element relative to the shiftable toothed part for dental engagement substantially at such synchronization.

5. In a transmission, rotatable driving and driven members, gearing means including a rotatable part, reaction means, a shiftable and rotatable control member arranged to have a dental engagement with the gearing means in one position and a dental engagement with the reaction means in another position to establish different ratios between the driving and driven members, means operable to shift the control member from one position to another incident to torque reversal, means for blocking the shift short of dental engagement, and means operable by the part about to be dentally engaged for rendering the blocking means ineffective substantially when the parts to be dentally engaged become synchronized.

6. In a transmission, rotatable driving and driven members, gearing means including a rotatable part, reaction means, a shiftable and rotatable control member arranged to have a dental engagement with the gearing means in one position and a dental engagement with the reaction means in another position to establish different ratios between the driving and driven members, means operable at will to place a load upon the control member and operable to aid in the shift of the control member incident to reversal of torque to disengage one dental connection and to establish another, means rotatable with the control member for blocking the shift of the control member in an intermediate non-engaged position, and means operable by the part about to be engaged for shifting the blocking means out of blocking position substantially when the control member and the portion to be dentally engaged therewith are substantially synchronized.

7. In a transmission, rotatable driving and driven members, gearing means including a rotatable part, a fixed reaction means, a control element shiftable upon helical splines on one of the gearing means, said control element being arranged to have a dental engagement with the reaction means in one position and with a gearing part in another position to establish different ratios between the driving and driven members, means operable incident to torque reversal to shift the control element, a ring element mounted for oscillation relative to the control element and having abutment teeth for stopping the shift of the control element in a position of no dental engagement, and means for shifting the ring element substantially when the control element and the part to be dentally engaged therewith come into synchronism.

8. In a transmission, rotatable driving and driven members, gearing means including a rotatable part, a fixed reaction means, a control element shiftable upon helical splines on one of the gearing means, said control element being arranged to have a dental engagement with the reaction means in one position and with a gearing part in another position to establish different ratios between the driving and driven members, means operable incident to torque reversal to shift the control element, said means including a control device operable at will, a ring element mounted for oscillation relative to the control element and having abutment teeth for stopping the shift of the control element in a position of no dental engagement, and means for shifting the ring element substantially when the control element and the part to be dentally engaged therewith come into synchronization.

9. In a transmission, rotatable driving and driven members, gearing means including a rotatable part, a fixed reaction means, a control element, shiftable upon helical splines on one of the gearing means, said control element being arranged to have a dental engagement with the reaction means in one position and with a gearing part in another position to establish different ratios between the driving and driven members, means operable incident to torque reversal to shift the control element, a ring element mounted for oscillation relative to the control element and having abutment teeth for stopping the shift of the control element in a position of no dental engagement, and means in the form of an overrunning clutch for shifting the ring element substantially when the control element and the part to be dentally engaged therewith come into synchronization.

10. In a transmission, driving and driven members and planetary type gearing including a sun gear, a fixed reaction means, one-way clutching arrangement between the sun gear of the gearing and the fixed reaction means, a control member slidably keyed to the sun gear by inclined means arranged to tend to shift the control member upon torque reversal, teeth on the control member and a gearing element for locking the gearing against movement when dentally engaged and for releasing the gearing when disenaged for transmission of the torque through the gearing, and centrifugal means for controlling the shift of the control member toward dental engaging position in accordance with the speed of rotation.

11. In a transmission, driving and driven members and planetary type gearing including a sun gear, a fixed reaction means, a one-way clutching arrangement between the sun gear of the gearing and the fixed reaction means, a control member slidably keyed to the sun gear by inclined means arranged to tend to shift the control member upon torque reversal, teeth on the control member and a gearing element for locking the gearing against movement when dentally engaged and for releasing the gearing when disengaged for transmission of the torque through the gearing, and centrifugal means for controlling the shift of the control member toward dental engaging position in accordance with the speed of rotation, and means for blocking the control member to prevent dental engagement and operable substantially as the parts to be dentally engaged become synchronized to discontinue the blocking action.

12. In a transmission, driving and driven members and planetary type gearing including a sun gear, a one-way clutch arrangement between the sun gear and another element of the gearing, a fixed reaction member, a control member slidably mounted on helical devices on the sun gear which tend to shift the control member incident to reversal of torque, teeth on the control member and reaction means arranged for a dental engagement and centrifugal means arranged to apply shifting forces on the control member toward dental engagement in accordance with the speed of rotation.

13. In a transmission, driving and driven members and planetary type gearing including a sun gear, a one-way clutch arrangement between the sun gear and another element of the gearing, a fixed reaction member, a control member slidably mounted on helical devices on the sun gear which tend to shift the control member incident to reversal of torque, teeth on the control member and reaction means arranged for a dental engagement, centrifugal means arranged to apply shifting forces on the control member toward dental engagement in accordance with the speed of rotation, and means for blocking the shift of the control member toward dental engagement and arranged to shift out of blocking position substantially when the control member is at zero R. P. M.

14. In a transmission, a driving member having teeth, a driven member having helical splines, an intermediate member mounted on the splines and having teeth for dental engagement with the driving member, means for applying an axial load on the intermediate member tending to break the dental engagement and operable to so break the dental engagement when torque reverses so that it is delivered from the driven member to the driving member, means for holding the intermediate member dentally disengaged while the driving member operates at a lower R. P. M. than the driven member, and means operable by the driving member for releasing the holding action substantially as the driving member comes up to the speed of rotation of the driven member to reestablish the dental engagement.

15. In a transmission, a driving member having teeth, a driven member having helical splines, an intermediate member mounted on the splines and having teeth for dental engagement with the driving member for the transmission of torque from the driving member to the driven member, means for applying an axial load on the intermediate member tending to shift the driven member out of dental engagement, and operable substantially upon torque reversal to aid in the shifting of the intermediate member to break the dental engagement, means operable as the driving member decelerates relative to the driven member to hold the intermediate member in dental disengaging position, and operable by the driving member to release said holding when the driving member, upon increase of R. P. M., substantially synchronizes with the driven member and intermediate member.

16. In a transmission, a driving member having teeth, a driven member having helical splines, an intermediate member mounted on the splines and having teeth for dental engagement with the driving member for the transmission of torque from the driving member to the driven member, means for applying an axial load on the intermediate member tending to shift the driven member out of dental engagement, and operable substantially upon torque reversal to aid in the shifting of the intermediate member to break the dental engagement, means operable as the driving member decelerates relative to the driven member to hold the intermediate member in dental disengaging position, and operable to release said holding when the driving member, upon increase of R. P. M., substantially synchronizes with the driven member and intermediate member, said last mentioned means comprising a ring oscillating on the driven member and having a one-way clutch arrangement with the driving member, and interengaging lugs on the intermediate member and said ring.

17. In a transmission, a driving member having teeth, a driven member having helical splines, an intermediate member mounted on the splines and having teeth for dental engagement with the driving member for the transmission of torque from the driving member to the driven member, means for applying an axial load on the intermediate member tending to shift the driven member out of dental engagement, and operable substantially upon torque reversal to aid in the shifting of the intermediate member to break the dental engagement, means operable as the driving member decelerates relative to the driven member to hold the intermediate member in dental disengaging position, and operable to release said holding when the driving member, upon increase of R. P. M., substantially synchronizes with the driven member and intermediate member, said last mentioned means comprising a ring oscillatable on the driven member and having a one-way clutch arrangement with the driving member, and interengaging lugs on the intermediate member and said ring, spring loading means on the ring for shift of the ring to engage the lugs, said one-way clutch serving to shift the ring to disengage the lugs as the driving member tends to exceed the R. P. M. of the driven member.

18. In a torque transmitting device, a driving member, a driven member, a shiftable coupling part, a connection between the coupling part and one member including an inclined plane, the coupling part and the other member having cooperating teeth arranged to be dentally engaged and disengaged by axial movement of the coupling part along the inclined plane, the inclined plane placing a thrust on the coupling part tending to maintain dental engagement when the torque is delivered from one member and placing a thrust on the coupling part tending to break the dental engagement when the torque is delivered from the other member, the angle of the inclined plane being such that the axial thrust on the coupling part under the torque load in a direction tending to break the dental engagement, is substantially balanced by the resistance to such movement of the coupling part due to the combined loads on the dentally engaged teeth and on the inclined plane, and control means for placing an additional thrust on the coupling part for breaking the dental engagement when torque tends to break the dental engagement.

19. In a torque transmitting device, a driving member, a driven member, a shiftable coupling part, a helical spline connection between the coupling part and one member, the coupling part and the other member having cooperating teeth arranged to be dentally engaged and disengaged by axial movement by the coupling part along the helical splines, the helical splines placing a thrust on the coupling part tending to maintain dental engagement when a torque is delivered from one member and placing a thrust on the coupling part tending to break the dental engagement when the torque is delivered from the other member, the angle of the helical splines being such that the axial thrust on the coupling part under a torque load and in a direction tending to break the dental engagement is substantially balanced by the resistance to such movement of the coupling part, due to the combined loads on the dentally engaged teeth and on the splines, and control means for placing an additional thrust on the coupling parts for breaking the dental engagement when the torque tends to break the dental engagement.

20. In a torque transmitting device, a driving member, a driven member, a shiftable coupling part, a helical spline connection between the coupling part and one member, the coupling part and the other member having cooperating teeth arranged to be dentally engaged and disengaged by axial movement of the coupling part along the helical splines, the helical splines placing an axial thrust on the coupling part in a direction tending to maintain dental engagement when the torque is delivered from the driving member to the driven member and placing a thrust on the coupling part in a direction tending to break the dental engagement when the torque is delivered from the driven member to the driving member, the angle of the helical splines being such that the axial thrust on the coupling part, when under a torque load with the torque delivered from the driven member to the driving member, is substantially balanced by the resistance to such movement of the coupling part due to the combined loads on the dentally engaged teeth and on the splines, control means for placing an additional thrust on the coupling part for breaking the dental connection when the torque is delivered from the driven member to the driving member, means for blocking the coupling part in dentally disengaged position when the driving member is operating at R. P. M.'s lower than that of the driven member and means operable upon acceleration of the driving member and when the driving member tends to overrun the driven member to release the blocking means for shift of the coupling part into dental engagement with the teeth of said other member.

21. In a torque transmitting device, a driving member, a driven member, a coupling part, one of the members and the coupling part having teeth for dental engagement, the other member and the coupling part being splined together so that the coupling part may shift axially relative thereto, means operable to place a thrust on the coupling part and shift the same axially to disengage the teeth, a blocking element, the element and the coupling part having blocker teeth arranged for inter-engagement, means mounting the blocking element for normal rotation with the coupling member and in a position so that the blocking teeth engage and hold the coupling part out of dental engaged position, said blocking element being rockable relative to the coupling part, an over-running clutch device between the member having the dental engaging teeth and the blocking element and effective to grip and shift the blocking element out of blocking position when the R. P. M. of the member with the dental engaging teeth substantially synchronizes with the R. P. M. of the coupling part.

22. In a torque transmitting device, a driving member, a driven member, a coupling part, the driving member and the coupling part having teeth arranged for dental engagement, a driving connection between the coupling part and the driven member for axial shift of the coupling part to establish and disestablish the dental engagement, means tending to shift the coupling part toward dental engaged position, control means operable to shift the coupling part to dis-establish the dental engagement to thereby uncouple the driving and driven members, a blocking element, means mounting the blocking element for rotation normally with the coupling part and for rocking action relative to the coupling part, the blocking element and the coupling part having inter-engaging blocking teeth, an over-running clutch between the blocking element and the driving member operable to release the blocking element upon deceleration of the driving member to an R. P. M. below that of the coupling part when the dental engagement is dis-established to effect an engagement of the blocking teeth and hold the coupling part in dental disengaged position at all times during operation of the driving member at an R. P. M. lower than the coupling part and operable to engage the blocking element and rock the same relative to the coupling part when the R. P. M. of the driving member tends to exceed that of the coupling part for re-establishment of the dental arrangement between the driving member and the coupling part.

23. In a torque transmitting device, a driving member, a driven member, a coupling part having a spline connection with one member along which the coupling part is axially shiftable, the coupling part and the other member having cooperating teeth arranged to be brought into and out of dental engagement by the axial shift of the coupling part, means including control means for placing an axial thrust on the coupling part, the spline connection and the dentally engaging teeth being angularly disposed helically relative to each other whereby transmission of torque places an axial thrust on the coupling part in a direction depending upon which member is delivering the torque, the relative angle being such that the thrust caused thereby in a direction which tends to break the dental engagement is insufficient to overcome the combined loads on the coupling part whereby the teeth remain dentally engaged, the control means being operable to vary the axial thrust on the coupling part for axial shift thereof, blocking means for preventing the coupling part from shifting to cause an engagement of the cooperating teeth while the driving and driven members are rotating at different speeds, the blocking means being operable by one of the members for releasing the blocking action when the driving and driven members come substantially into synchronization.

24. In a transmission, rotary driving and driven members, rotary gear members for establishing different driving ratios between the driving and driven members, a coupler, means slidably and drivingly mounting the coupler on one of said members, dental teeth on the coupler, cooperating dental teeth adapted to engage with the teeth on the coupler when the coupler is in one position of its sliding movement for the transmission of torque and for establishing one driving ratio between the driving and driven members, the said means for slidably connecting the coupler on one of said members and the dentally engaging teeth being angularly disposed helically relative to each other whereby transmission of torque places an axial thrust on the coupler in a direction depending upon whether the torque is delivered from the driving member or the driven member, control means for placing an axial thrust on the coupler, the said relative angle being such that the thrust caused thereby in a direction which tends to break the dental engagement is insufficient to shift the coupler due to the combined loads on the coupler, whereby the teeth remain dentally engaged upon torque reversal, said control means being operable to vary the thrust on the coupler for axial shift to break the dental engagement when the thrust on the coupler incident to the transmission of torque is in a direction tending to break the dental engagement, and means for establishing another connection between the driving and driven members at a different ratio.

25. In a transmission, rotary driving and driven members, rotary gear members for establishing different driving ratios between the driving and driven members, a coupler, means slidably and drivingly mounting the coupler on one of said members, dental teeth on the coupler, cooperating dental teeth adapted to engage with the teeth on the coupler when the coupler is in one position of its sliding movement for the transmission of torque and for establishing one driving ratio between the driving and driven members, the said means for slidably connecting the coupler on one of said members and the dentally engaging teeth being angularly disposed helically relative to each other whereby transmission of torque places an axial thrust on the coupler in a direction depending upon whether the torque is delivered from the driving member or the driven member, control means for placing an axial thrust on the coupler, the said relative angle being such that the thrust caused thereby in a direction which tends to break the dental engagement is insufficient to shift the coupler due to the combined loads on the coupler, whereby the teeth remain dentally engaged upon torque reversal, said control means being operable to vary the thrust on the coupler for axial shift to break the dental engagement when the thrust on the coupler incident to the transmission of torque is in a direction tending to break the dental engagement, means for establishing another connection between the driving and driven members at a different ratio, said control means being also operable to vary the axial thrust on the coupler for shift of the coupler toward dentally engaged position and blocking means for preventing the coupler from shifting to dental engaged position while the coupler and the teeth to be dentally engaged thereby are dis-synchronized, the blocking means being operable by one of the members for releasing the blocking action when the coupler and the teeth about to be dentally engaged thereby become substantially synchronized.

26. In a transmission, rotary driving and driven members, rotary gear members for establishing driving connections of different ratios between the driving and driven members, a coupler, means slidably and drivingly mounting the coupler on one of the members, dental teeth on the coupler, cooperating dental teeth adapted to engage with the teeth on the coupler when the coupler is in one position of its sliding movement for the transmission of torque and for establishing one driving ratio between the driving and driven members, the said means for slidably mounting the coupler on one of said members and the dentally engaging teeth being angularly disposed helically relative to each other so that when torque is transmitted from the driving member an axial thrust is placed on the coupler tending to shift it toward dentally engaged position, and so that when there is a torque reversal at the dentally engaging teeth the axial thrust tends to shift the coupler out of dentally engaged position, control means for placing an axial thrust on the coupler, the relative angle being such that the thrust upon said torque reversal is insufficient to shift the coupler whereby the teeth remain dentally engaged, said control means being operable to vary the thrust on the coupler for axial shift upon torque reversal at the dentally engaging teeth to break the dental engagement and means for establishing another connection between the driving and driven members at a different ratio.

27. In a transmission, rotary driving and driven members, rotary gear members for establishing driving connections of different ratios between the driving and driven members, a coupler, means slidably and drivingly mounting the coupler on one of the members, dental teeth on the coupler, cooperating dental teeth adapted to engage with the teeth on the coupler when the coupler is in one position of its sliding movement for the transmission of torque and for establishing one driving ratio between the driving and driven members, the said means for slidably mounting the coupler on one of said members and the dentally engaging teeth being angularly disposed helically relative to each other so that when torque is transmitted from the driving member an axial thrust is placed on the coupler tending to shift it toward dentally engaged position, and so that when there is a torque reversal at the dentally engaging teeth the axial thrust tends to shift the coupler out of dentally engaged position, control means for placing an axial thrust on the coupler, the relative angle being such that the thrust upon said torque reversal is insufficient to shift the coupler whereby the teeth remain dentally engaged, said control means being operable to vary the thrust on the coupler for axial shift upon torque reversal at the dentally engaging teeth to break the dental engagement, means for establishing another connection between the driving and driven members at a different ratio, said control means being also operable to vary the thrust on the coupler for shift of the coupler toward said dentally engaged position and blocking means for blocking movement of the coupler toward dentally engaged position while the coupler and the teeth to be dentally engaged are dis-synchronized, the blocking means being operable by one of said members for releasing the blocking action when the said teeth become substantially synchronized.

28. In a transmission, rotary driving and driven members, rotary gear members for establishing different driving ratios between the driving and driven members, a coupler, means slidably and drivingly mounting the coupler on one of the members, dental teeth on the coupler, cooperating dental teeth adapted to engage with the teeth on the coupler when the coupler is in one position of its sliding movement for the transmission of torque and for establishing one driving ratio between the driving and driven members, the said means for slidably connecting the coupler on one of said members and the dentally engaging teeth being angularly disposed helically relative to each other so that when torque is transmitted from the driving member there is an axial thrust on the coupler tending to shift it toward dentally engaged position and so that when there is a torque reversal at the dentally engaged teeth a thrust is placed on the coupler tending to shift it out of dental engaged position, control means for placing an axial thrust on the coupler, the relative angle being such that the thrust on the coupler incident to said torque reversal is normally insufficient to overcome the combined loads on the coupler whereby the teeth remain dentally engaged, said control means being operable to vary the thrust on the coupler for axial shift upon torque reversal at the engaging teeth to break the dental engagement, and means for establishing a connection between the driving and driven members at a different ratio.

29. In a transmission, rotary driving and driven members, rotary gear members for establishing different driving ratios between the driving and driven members, a coupler, means slidably and drivingly mounting the coupler on one of the members, dental teeth on the coupler, cooperating dental teeth adapted to engage with the teeth on the coupler when the coupler is in one position of its sliding movement for the transmission of torque and for establishing one driving ratio between the driving and driven members, the said means for slidably connecting the coupler on one of said members and the dentally engaging teeth being angularly disposed helically relative to each other so that when torque is transmitted from the driving member there is an axial thrust on the coupler tending to shift it toward dentally engaged position and so that when there is a torque reversal at the dentally engaged teeth a thrust is placed on the coupler tending to shift it out of dental engaged position, control means for placing an axial thrust on the coupler, the relative angle being such that the thrust on the coupler incident to said torque reversal is normally insufficient to overcome the combined loads on the coupler whereby the teeth remain dentally engaged, said control means being operable to vary the thrust on the coupler for axial shift upon torque reversal at the engaging teeth to break the dental engagement, means for establishing a connection between the driving and driven members at a different ratio, said control means being also operable to vary the thrust on the coupler for shift of the coupler toward said dental engaged position and blocking means for blocking movement of the coupler toward dental engaged position while the teeth about to be dentally engaged are dis-synchronized, the blocking means being operable by one of the members for releasing the blocking action when the dentally engaging teeth become substantially synchronized.

ERNEST E. WEMP.